Oct. 22, 1968  R. R. SIDERS ET AL  3,407,378
ELECTRICAL CONTACT SYSTEM
Filed May 24, 1966
3 Sheets-Sheet 2
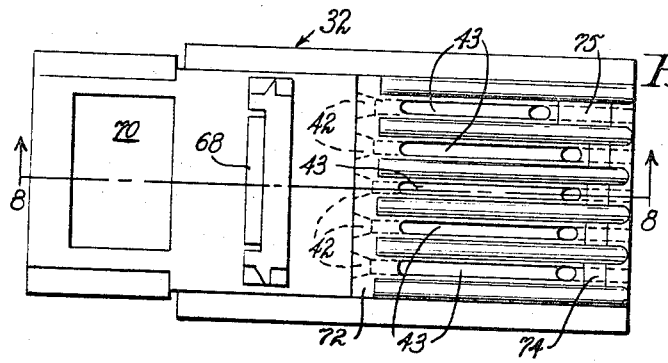
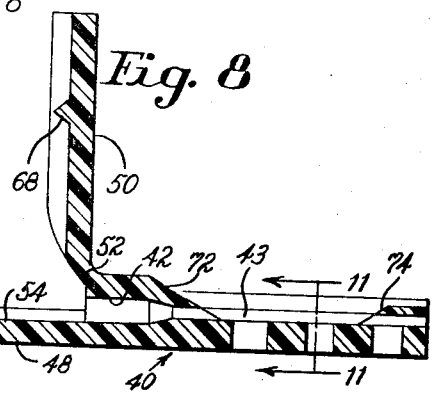
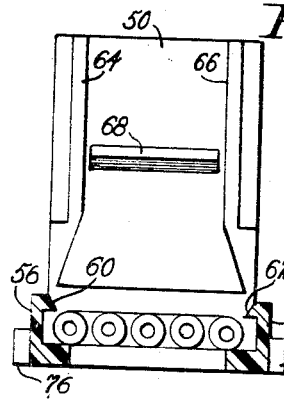
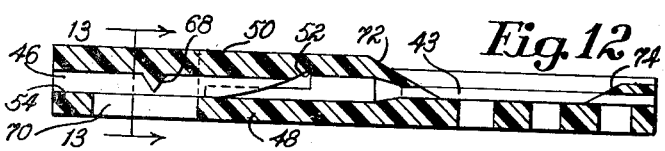
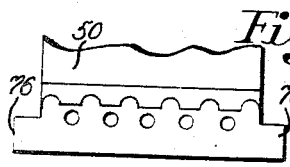
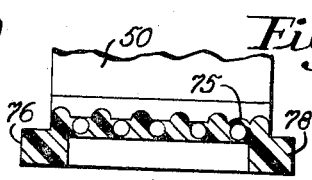
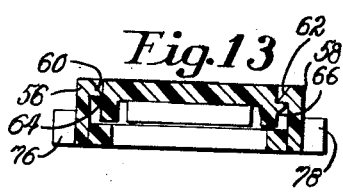
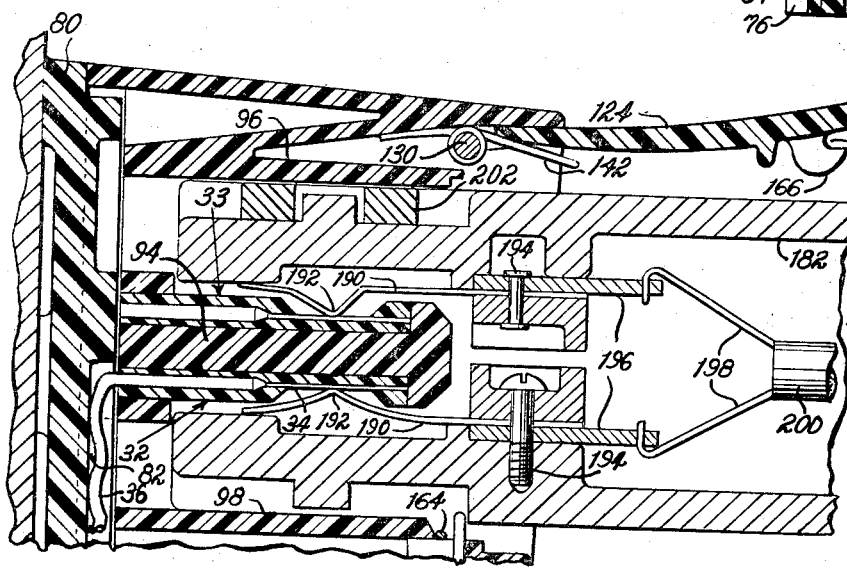

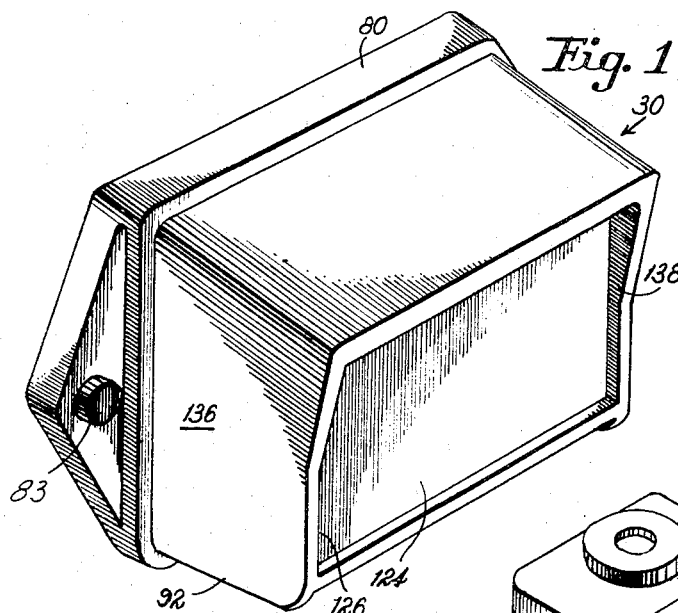
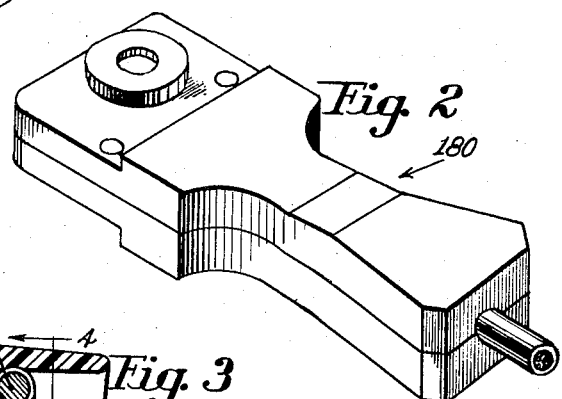
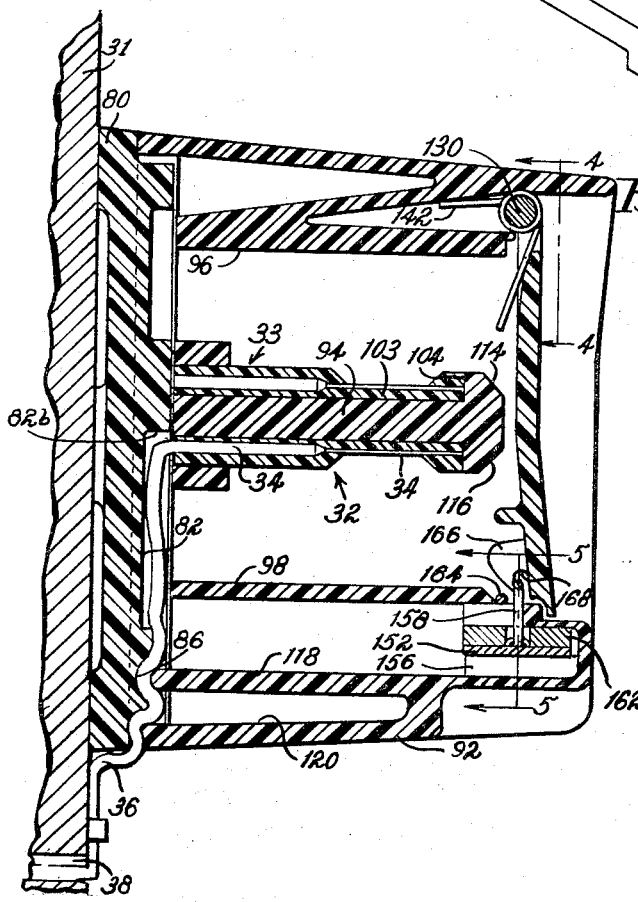
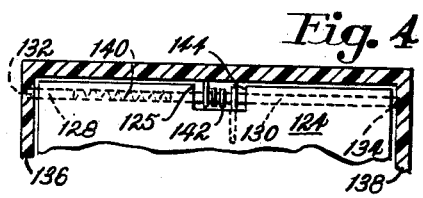
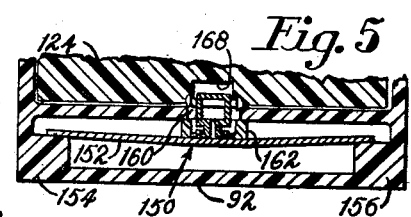
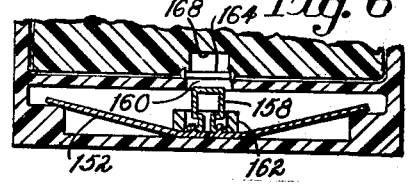

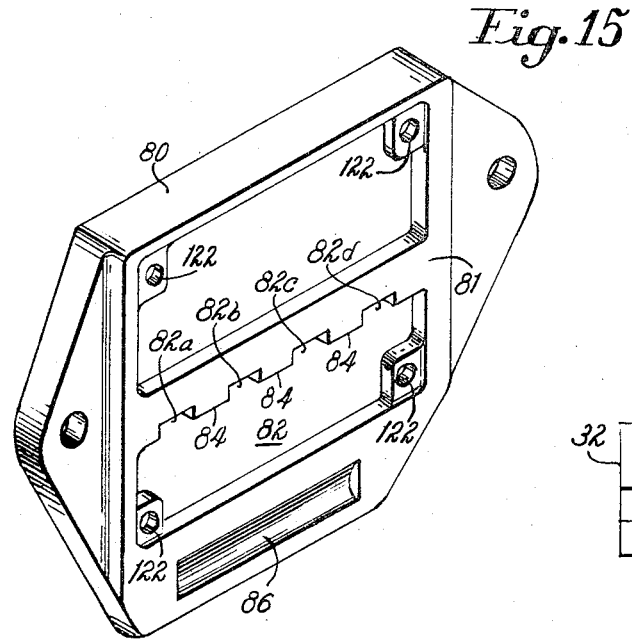
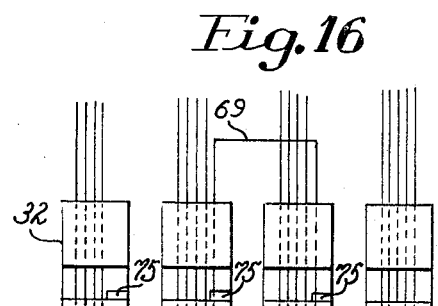
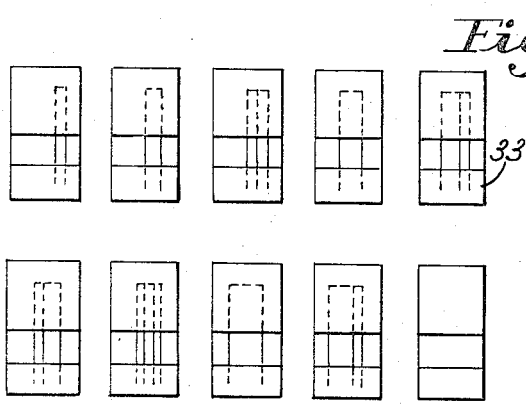
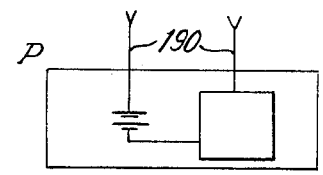
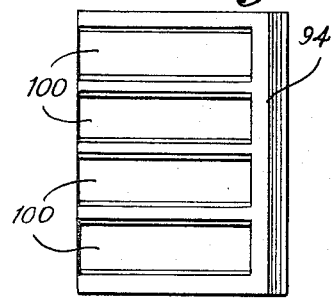
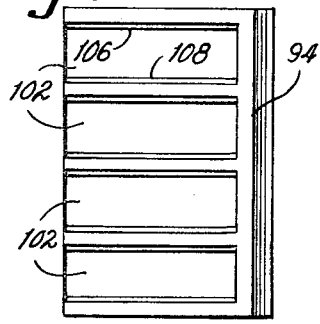

United States Patent Office 3,407,378
Patented Oct. 22, 1968

3,407,378
ELECTRICAL CONTACT SYSTEM
Robert Raymond Siders, Medfield, and Roger Williams Hood, North Attleboro, Mass., assignors to Hersey Sparling Meter Company, Dedham, Mass., a corporation of Massachusetts
Filed May 24, 1966, Ser. No. 552,605
7 Claims. (Cl. 339—176)

ABSTRACT OF THE DISCLOSURE

Electrical contact system having cartridge for receiving wire and housing to support cartridge, housing having opening for connector to contact wire in cartridge. Cartridge has hinged wall to clinch wire and cut away wall to expose wire for contact. Housing has magnetically latched door.

---

This invention relates to electrically connecting and disconnecting. The invention is especially useful in conjunction with apparatus disclosed in United States patent application Ser. No. 527,852, filed Feb. 16, 1966, and in a United States patent application entitled Portable Recording filed the same day as the present application by Robert Raymond Siders.

Primary objects of the invention are to provide an improved simple arrangement for temporary electrical connections in which the connecting and disconnecting mechanism is easily installed and used and is highly reliable even in an environment not conducive to good electrical contact. Other objects are to provide such an arrangement in which completion of a plurality of electrical connections can be verified, in which tampering by unauthorized persons is resisted, and in which separate primary and secondary electrical connections can be made simultaneously.

In general the invention features a cartridge having a wire retaining portion, a housing having an opening sized to admit a connector, and a portion for supporting the cartridge in a position adjacent the opening so that the connector is in direct physical and electrical contact with the wire when the connector extends into the housing through the opening. In preferred embodiments the cartridge has an upper wall a portion of which is movable (preferably through hinging) toward and away from the floor of wire receiving openings extending generally parallel to the upper wall; a part of the cartridge is cut away adjacent the openings to expose lengths of wire in the openings; the movable wall portion has a projection for clinching the wires against the floor; one of the cartridge openings is shorter than the others; the housing has a specially recessed cartridge retaining shelf adjacent the housing opening; the connector has contact members (preferably brushes) mounted for resilient sliding contact with the wires, and a power supply with a normally open switch; the housing includes circuitry for closing the normally open switch in the connector only after the connector is inserted sufficiently far into the housing to electrically and physically contact the wire; the housing opening has a magnetically latched door, the operable portion of the latch being fully enclosed when the door is shut; and the wires in said cartridge have outer surfaces formed of a metal oxidizable to create a thin rupturable oxide film.

Other objects, features, and advantages will appear from the following description of a preferred embodiment of the invention, taken together with the attached drawings thereof, in which:

FIG. 1 is a perspective view of a portion of the apparatus of the invention;

FIG. 2 is a perspective view of a portion of the apparatus of the invention;
FIG. 3 is a vertical section through the housing and one pair of wire cartridges;
FIG. 4 is a section through 4—4 of FIG. 3;
FIG. 5 is a section through 5—5 of FIG. 3;
FIG. 6 is a view similar to FIG. 5 with the door latch unlocked;
FIG. 7 is a plan view of a cartridge of the invention;
FIG. 8 is a section through 8—8 of FIG. 7;
FIG. 9 is a section through 9—9 of FIG. 8;
FIG. 10 is an end elevation from the left of FIG. 7;
FIG. 11 is a section through 11—11 of FIG. 8;
FIG. 12 is a view similar to FIG. 8 with the cartridge closed;
FIG. 13 is a section through 13—13 of FIG. 12;
FIG. 14 is a section similar to FIG. 3 with the probe inserted in the housing;
FIG. 15 is a perspective view of a portion of the housing;
FIG. 16 is a schematic wiring diagram;
FIG. 17 is a schematic wiring diagram;
FIG. 18 is an elevation of the rear of the housing;
FIG. 19 is a top plan view of the housing shelf with the wire cartridges removed; and
FIG. 20 is a bottom plan view of the housing shelf with the wire cartridges removed.

Terminal assembly 30, mounted on exterior building wall 31, receives in four cartridges 32 the free wire ends 34 of multiwire cable 36 (here a 17 wire cable carrying an 8–4–2–1 binary code from a water meter register) which extends through opening 38 in wall 31.

Each molded polypropylene cartridge 32 (FIGS. 7–13) includes a main body 40 having five parallel longitudinal holes 42 respectively communicating at their forward ends with five parallel grooves 43 and at their rearward ends with an opening 46 extending longitudinally through the rearward portion 48 of body 40. Upper wall 50 of body 40 is notched from below to provide a thin (.015″) hinge 52 enabling wall 50 to be swung away from the floor 54 of opening 46. Side walls 56, 58 of opening 46 provide inwardly directed beveled flanges 60, 62 under which snap cooperatively beveled lateral projections 64, 66 of wall 50 to secure wall 50 in its closed position. Transverse pointed ridge 68 on the lower surface of wall 50 is aligned just above transverse slot 70 through floor 54. Body 40 is cut away between beveled surfaces 72, 74 to expose grooves 43. The right hand (in FIG. 11) groove 43 is covered adjacent surface 74 for a short distance by semi-cylindrical thin plastic web 75. The sides of body 40 extend laterally at reduced height to provide tongues 76, 78.

Housing back plate 80 (molded acrylic plastic) is fastened to wall 31 by a screw 83 at each side and has a generally oblong recess 82 in front surface 81 with projections 84 defining four upward recess extensions 82a–d along the top edge of recess 82, each extension being slightly narrower than the width of the rearward end of cartridge 32. Stress relief cavity 86 extends transversely below recess 82.

Housing shell 92 (molded acrylic plastic) supports shelf 94 midway between upper and lower horizontal guide walls 96 and 98. The top and bottom surfaces of shelf 94 each have four recesses 100 and 102, each recess being sized to admit a cartridge 32 and having a floor 103, a front stop surface 104 and a pair of side tongues 106, 108 arranged to receive cartridge tongues 76, 78 between themselves and floor 103. Eight openings 110 through the rear of shell 92 provide access to these recesses. The front end of shelf 94 has beveled surfaces 114, 116. Screws secure back plate 80 to shell 92 at 122 (FIG. 15), with ledge 118 (FIG. 3), between guide wall 98 and bottom wall 120, extending into cavity 86.

Door 124 is pivotally mounted in front opening 126 of shell 92 on pins 128, 130 extending through the upper end 125 of door 124 and forced apart and into blind holes 132, 134 in shell side walls 136, 138 by compression spring 140. Torsion spring 142, mounted on pin 130 at cut away door portion 144 tends to bias door 124 in its open position.

Latch assembly 150 includes a flat stamped .008″ beryllium copper spring 152 disposed at the front of shell 92 below wall 98, with its ends resting on bosses 154, 156 integral with the shell. Brass formed wire spring 158 is mounted by its free ends on spring 152 and extends upwardly through slot 160 in wall 98. Slotted circular four-pole ceramic magnet 162 is slipped over and surrounds spring 158 below slot 160. Brass back-up pin 164 is mounted along the rear edge of slot 160.

Rounded boss 166 at the rearward bottom of door 124 is vertically slotted at 168 to receive spring 158.

To assemble the terminal assembly, four cartridges 32 are factory installed at the stripped and roughly tin coated of the seventeen data wire ends 34 by inserting the wires through opening 46 into holes 42 and grooves 43 with wall 50 swung open and then snapping wall 50 closed. Ridge 68 will press the wires into slot 70 to provide strain relief. In three cartridges the right hand hole 42 will not be occupied by a data wire (FIG. 16). Opposite ends of a separate stripped and tinned wire 69 are placed in two of the unoccupied holes 42. Web 75 is cut away from the cartridge in which the right hand hole 42 is occupied by a data wire. The four wire holders allow factory assembly that will go through ¾″ hole in building, and still require no wiring on field installation.

The wired cartridges 32 are inserted into recesses 102 with the exposed wires downwardly directed. If required, four additional cartridges 33, prewired to provide a meter identification code (FIG. 17), can be inserted in recesses 100 with the exposed wires upwardly directed. Back plate 80 is attached to the shell, with ledge 118 forcing cable 36 into cavity 86 to provide strain relief, and plate 80 is mounted on wall 31.

Probe 180 (FIGS. 2 and 14) has a housing 182 in which are supported brush assemblies arranged to contact the exposed wires in cartridges 32. Four groups of five brushes each are secured to both the top and bottom inside walls of the probe, giving a total of forty brushes. Each brush 190 has a sharp bend 192 directed away from the housing wall in which it is mounted, is secured to the housing at one end by bolt 194, and rests freely on the housing wall at its other end. Conductor 196 connects the brush to wire 198 of output cable 200.

Magnet 202, identical to magnet 162, is mounted on the top front of the probe. The probe is sized to pass through opening 126 and in turn receive shelf 94 between its upper and lower brush assemblies. A power supply P to the brushes is wired in series with the two brushes corresponding to the positions of the holes 42 containing the ends of wire 69.

In operation, probe magnet 202 is placed under the front of the housing assembly to draw down magnet 162 and with it spring 152 and formed wire 158, thereby allowing spring 142 to open door 124. The probe is inserted through opening 126 with the brushes 190 making sliding contact at bends 192 with the data wires and wire 69. During the relative sliding of the brushes 192 against the wires the brushes are urged against the wires and rupture the thin oxide film that has formed on the exposed wire surfaces. Due to webs 75, the probe must be inserted farther to close the power supply circuit than to contact the data wires, thus ensuring that all the data wires are in contact with their respective brushes before a reading is taken, and providing a sampling of the contact condition to insure an accurate reading.

Other embodiments will occur to those skilled in the art and are within the following claims.

What is claimed is:

1. Apparatus for facilitating the electrical connecting and disconnecting of at least one wire and at least one connector, said apparatus comprising:
   at least one cartridge having
      a first portion providing a lower wall, and
      a second portion integral with said first portion and providing an upper wall spaced from said lower wall to provide an opening for receiving said wire, a section of said second portion being hinged to allow movement of the corresponding section of said upper wall toward and away from said lower wall, the spacing between said lower wall and said corresponding section of said upper wall being less than the thickness of said wire when said hinged section is in its position closest to said lower wall, whereby said wire is clinched between said walls, said portions having cooperating elements to secure said hinged section in said position closest to said lower wall,
      a portion of one of said walls being cut away to expose a length of said wire, and
   a housing having an opening sized to admit said connector, and a shelf adjacent said opening having a recess for admitting and retaining said cartridge in a position adjacent said opening, said connector being in direct physical and electrical contact with said wire at said cut away portion of said wall when said connector extends into said housing through said opening,
   the connector having a pair of opposing support surfaces spaced to admit said shelf therebetween and a resilient contact member supported against at least one of said surfaces for elastic movement toward and away from said surface.

2. The apparatus of claim 1 wherein said recess has a front stop surface and laterally inwardly extending tongues, said cartridge having laterally outwardly extending projections arranged to cooperate with said tongues to locate said cartridge in said recess.

3. The apparatus of claim 1 wherein said housing has a surface adjacent said cartridge on the opposite end of said cartridge from said opening, said surface providing a stop against movement of said cartridge in the direction away from said opening.

4. The apparatus of claim 1 wherein said cartridge is on one surface of said shelf and a second cartridge wired to provide a code representative of said housing is on a second surface of said shelf, said connector having a resilient contact member supported against each of said support surfaces for simultaneously contacting, respectively, said cartridge and said second cartridge.

5. The apparatus of claim 1 in which said contact is made through a brush carried by said connector, said brush being mounted in said connector and yieldably biased in position and extent to be urged transversely against said wire during movement of said connector and said brush longitudinally of said wire in making said contact.

6. The apparatus of claim 5 in which said wire has an outer surface portion for engaging said brush, said outer surface portion being formed of a metal oxidizable to create a thin rupturable oxide film.

7. Apparatus for facilitating the electrical connecting and disconnecting of at least one wire mounted in a cartridge and at least one connector, said apparatus comprising:
   at least one cartridge having a retaining portion for retaining a wire therein, with a portion of said wire exposed for contact,
   a housing having an opening sized to admit said connector, and means within said opening for supporting said cartridge in a position adjacent said opening, said connector being in direct physical and electrical contact with said wire when said connector extends into said housing through said opening, a door pivotally mounted in said housing opening and a latch normally retaining said door in its position closing said opening, said latch including a movable portion received in said door when closed, said movable portion having mounted thereon a magnet, said magnet and movable portion being fully enclosed in said housing when said door is closed.

References Cited

UNITED STATES PATENTS

| | | | |
|---|---|---|---|
| 3,290,461 | 12/1966 | Schumacher | 200—51.1 |
| 3,137,537 | 6/1964 | Cole et al. | 339—176 |
| 3,159,447 | 12/1964 | Crimmins et al. | 339—17 |
| 3,188,604 | 6/1965 | Mogestad et al. | 339—59 |

ROBERT K. SCHAEFER, *Primary Examiner.*

D. SMITH, *Assistant Examiner.*